(12) United States Patent
Shipley et al.

(10) Patent No.: US 12,450,969 B1
(45) Date of Patent: Oct. 21, 2025

(54) SYSTEM AND METHODS FOR CONVERTING BANKNOTES TO DIGITAL CURRENCY

(71) Applicant: UIPCO, LLC, San Antonio, TX (US)

(72) Inventors: Brian Francisco Shipley, Plano, TX (US); Brian Tougas, Spring Branch, TX (US); Gideon Bowie Luck, Wylie, TX (US); Sean Carl Mitchem, San Antonio, TX (US); Christopher Russell, The Colony, TX (US); Andre Rene Buentello, San Antonio, TX (US); Jose L. Romero, Jr., San Antonio, TX (US); David Joaquin Harris, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 379 days.

(21) Appl. No.: 18/192,083

(22) Filed: Mar. 29, 2023

Related U.S. Application Data

(60) Provisional application No. 63/325,277, filed on Mar. 30, 2022.

(51) Int. Cl.
*G07D 11/34* (2019.01)
*G07D 11/22* (2019.01)

(52) U.S. Cl.
CPC ............ *G07D 11/34* (2019.01); *G07D 11/22* (2019.01)

(58) Field of Classification Search
CPC ........ G07D 11/14; G07D 11/16; G07D 11/30; G07D 11/34; G07D 11/32
See application file for complete search history.

(56) References Cited

U.S. PATENT DOCUMENTS

| | | | |
|---|---|---|---|
| 6,351,552 B1* | 2/2002 | Weaver | G07D 11/34 |
| | | | 382/135 |
| 10,783,501 B1* | 9/2020 | Ramanathan | G06Q 20/0655 |
| 11,681,995 B1* | 6/2023 | Ramanathan | G07F 19/202 |
| | | | 705/17 |
| 11,829,976 B1* | 11/2023 | Ramanathan | G07G 1/0036 |
| 2020/0160331 A1* | 5/2020 | Kurien | G07F 19/201 |
| 2020/0168022 A1* | 5/2020 | Johnson | G07F 17/3225 |

* cited by examiner

*Primary Examiner* — Bobby Yeonjin Kim
(74) *Attorney, Agent, or Firm* — Plumsea Law Group, LLC

(57) ABSTRACT

A system and method for transforming physical currency in the form of banknotes into digital currency is disclosed. The system includes a device that can scan and destroy banknotes, and send information about the destroyed banknotes to a digital currency minting system so that a corresponding value of digital currency can be created on a corresponding digital currency network. The device includes at least two optical devices, where one of the optical devices is displaced from a shredding assembly at a particular distance to ensure that a confirmation of destruction image including a serial number on the banknote can be captured at approximately the same time that a sufficient amount of the banknote has been shredded to render the banknote invalid for use as currency.

20 Claims, 11 Drawing Sheets

SYSTEM AND METHODS FOR CONVERTING BANKNOTES TO DIGITAL CURRENCY

CROSS-REFERENCE TO RELATED APPLICATIONS

This application claims the benefit of Provisional Patent Application No. 63/325,277 filed Mar. 30, 2022, and titled "System and Methods for Converting Banknotes to Digital Currency," which is incorporated by reference herein in its entirety.

TECHNICAL FIELD

The present disclosure generally relates to systems and devices for scanning and shredding money.

BACKGROUND

Central banks for countries/states are tasked with creating, managing the circulation of, and destroying currency in the form of physical banknotes and/or coins. As more and more forms of electronic money become available, including digital currencies, such as Bitcoin, central banks will need to manage the conversion of physical currency (in the form of banknotes and coins) to digital currency to maintain some control over the total money supply.

There is a need in the art for a system and method that addresses the shortcomings discussed above.

SUMMARY

In one aspect, a device includes a device housing, a slot disposed in the device housing for receiving a banknote, where the slot includes a banknote receiving end and a banknote exiting end, and one or more conveying mechanisms to move the banknote from the banknote receiving end to the banknote exiting end of the slot. The device further includes a first optical device for scanning images of the banknote passed through the slot, a shredding assembly for shredding the banknote passed through the slot, and a second optical device for capturing a confirmation of destruction image of the banknote, the confirmation of destruction image including a serial number of the banknote, and the confirmation of destruction image being captured after a sufficient portion of the banknote has been destroyed by the shredding assembly so as to render the banknote invalid as currency.

In another aspect, a device includes a device housing, a slot disposed in the device housing for receiving banknotes, wherein the slot includes a banknote receiving end and a banknote exiting end, one or more conveying mechanisms to move banknotes from the banknote receiving end to the banknote exiting end of the slot, a first optical device for scanning images of banknotes passed through the slot, a second optical device for capturing images of serial numbers on banknotes passed through the slot, and a shredding assembly for shredding banknotes passed through the slot. The device is configured to receive a banknote at the banknote receiving end, convey the banknote through the slot towards the banknote exiting end using the one or more conveying mechanisms, scan a full image of the banknote using the first optical device, capture an image of a serial number on the banknote using the second optical device to provide confirmation of destruction of the banknote, and shred the banknote before the banknote exits the slot.

In another aspect, a system for converting physical currency to digital currency includes a device. The device includes a device housing, a slot disposed in the device housing for receiving a banknote, where the slot includes a banknote receiving end and a banknote exiting end. The device also includes one or more conveying mechanisms to move the banknote from the banknote receiving end to the banknote exiting end of the slot, a first optical device for scanning images of the banknote passed through the slot, a shredding assembly for shredding the banknote passed through the slot, and a second optical device for capturing a confirmation of destruction image of the banknote, the confirmation of destruction image including a serial number of the banknote, and the confirmation of destruction image being captured after a sufficient portion of the banknote has been destroyed by the shredding assembly so as to render the banknote invalid as currency. The system also includes a digital currency minting system in communication with the device and in communication with a digital currency network. The device is configured to receive a banknote at the banknote receiving end of the device, convey the banknote through the slot towards the banknote exiting end using the one or more conveying mechanisms, scan a full image of the banknote using the first optical device and extract currency value information from the full image of the banknote, capture a confirmation of destruction image including a serial number on the banknote using the second optical device, shred the banknote before the banknote exits the slot, and send the currency value information and the confirmation of destruction to the digital currency minting system. The digital currency minting system is further configured to create new digital currency with a value according to the currency value information, the new digital currency being useable on the digital currency network.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
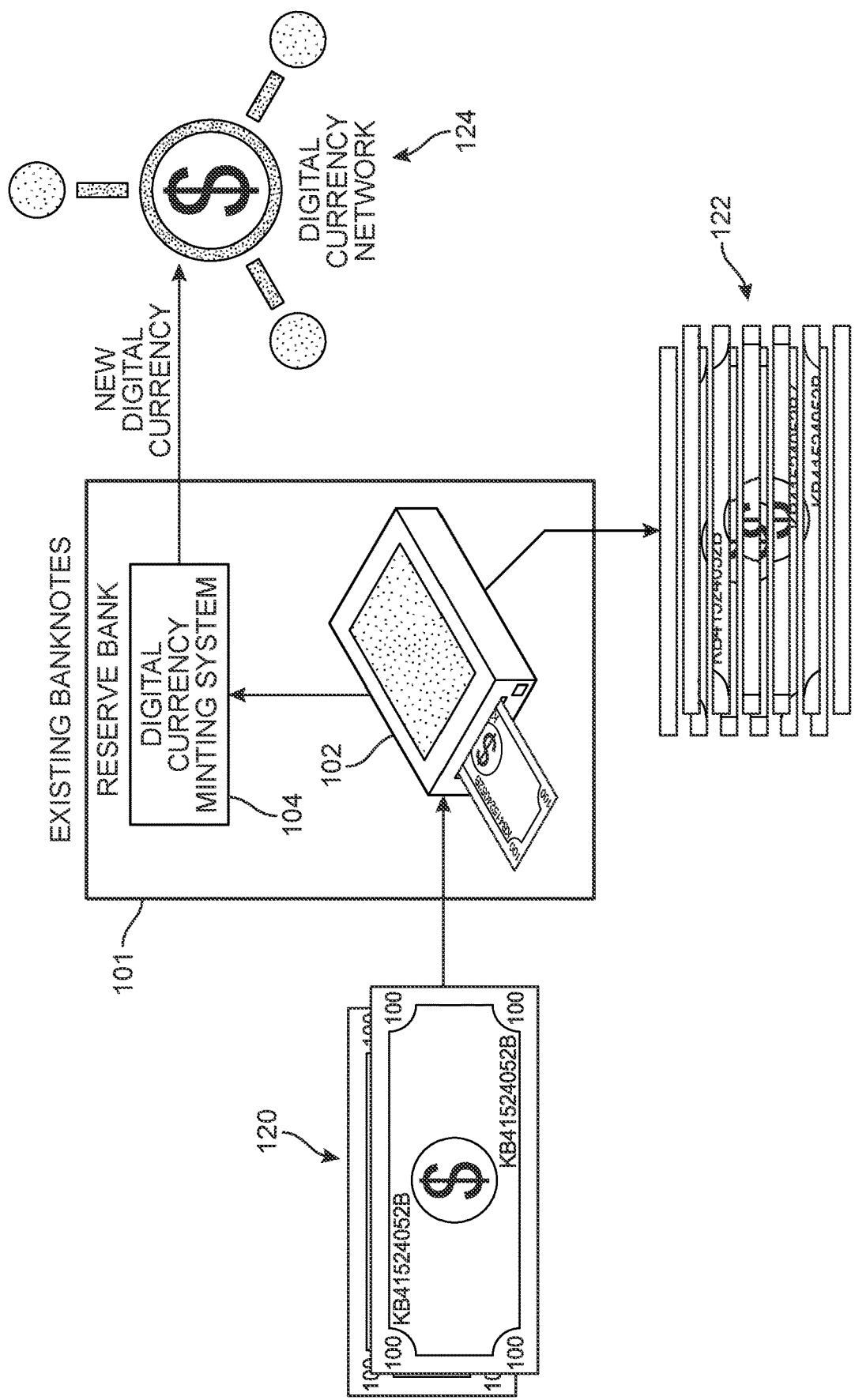
FIG. 1 is a schematic view of a system for transforming physical currency into digital currency, according to an embodiment.

The embodiments provide systems and methods for converting physical currency into digital currency so that the total money supply of cash and digital currency combined, remains approximately constant. Specifically, the embodiments provide a device that scans and records images of fiat currency (US dollars for example) as the currency is being shredded. In some cases, this may be done by a reserve bank (such as a member bank of the U.S. Federal Reserve) to convert physical currency into digital currency. The device may have an upstream optical scanner that scans the entire banknote as the banknote is fed through the machine. The device may also have a second optical camera with an adjustable position upstream from a shredding assembly that acts to shred the banknotes. The second optical camera can be positioned so that after a certain percentage of the bill has been destroyed, the second optical device capture an image of the destroyed banknote's serial number. This would confirm destruction of the banknote, ensuring that this money could not be double spent as both a physical banknote and as a separately created digital currency.

Various terms and definitions are gathered here for convenience.

A "banknote," also referred to as a "bill" or "note", is an item of paper money that functions as a promissory note. The banknote gives the bearer the right to receive a stated amount of money from an associated central bank, upon demand. In the United States, exemplary banknotes come in one of various possible "denominations," which include, but are not limited to: one-dollar bills, five-dollar bills, ten-dollar bills, twenty-dollar bills, and one-hundred-dollar bills.

A "reserve bank" or "central bank" is a public institution for managing a state/country's currency, including the supply of money and interest rates. A reserve bank may control how much currency is in circulation. Moreover, a reserve bank may have control over how many new banknotes are printed and/or destroyed each year.

A "digital currency network" refers to any network that is used for the creation, management, and processing of new electronic money, referred to as "digital currency." As an example, Bitcoin is a decentralized digital currency that is managed using a peer-to-peer network that stores and manages a distributed public ledger (the blockchain). In some cases, digital currencies could be cryptocurrencies.

The term "banknote damage threshold" refers to the percent of a banknote's area that can be physically damaged and still be considered valid currency by a corresponding reserve bank. In different countries or monetary systems, the specific value of the banknote damage threshold can vary. In the United States, for example, this threshold has a value of approximately 49%, such that any banknotes in which fifty percent or less of the banknote remains intact is considered invalid or "mutilated currency."

The term "confirmation of destruction" (or "proof of destruction") refers to information that can be used to confirm, or prove, that a banknote has been destroyed, and thus may not be used once new digital currency has been created in place of the banknote. In the embodiments, confirmation of destruction could comprise an image of a portion of the banknote that includes: 1) information to identify the banknote, including a serial number, and optionally, a denomination of the banknote; and 2) a process for capturing this image at the time the banknote is considered destroyed, or any time after. Such an image (a "confirmation of destruction image"), providing confirmation of destruction, can then be checked by the digital currency minting system (or other auditing system) to ensure that digital currency is only created for destroyed banknotes.

FIG. 1 is a schematic view of a cash-to-digital currency conversion system 101 ("conversion system 101") that can be used to transform banknotes 120 into digital currency that can be used with a digital currency network 124. System 101 may further comprise a banknote destroying device 102 ("device 102") and a digital currency minting system 104. Digital currency minting system 104 may comprise suitable hardware and software for creating new digital currency and/or for adding existing "reserved" digital currency into the available supply of digital currency on an associated digital currency network.

As seen in FIG. 1, system 101 can receive banknotes 120 at device 102. As described in further detail below, device 102 processes banknotes 120. This processing includes physically destroying banknotes 120 to generate shredded notes 122. Additionally, as part of processing banknotes 120, information about banknotes 120, including the denominations of the banknotes and a serial numbers of the banknotes, is sent to digital currency minting system 104. Digital currency minting system 104 can then either create, or otherwise release previously reserved, digital currency for exchange on digital currency network 124.

It is contemplated that in some situations, conversion system 101 may be managed by a reserve bank, such as a bank of the Federal Reserve System of the United States. In such a situation, the reserve bank may play a unique roll among members of the digital currency network. For example, the digital currency network could be a digital currency network created and/or managed by the reserve bank for the purposes of providing a centrally backed currency system for a given state, country, or region. In such cases, the reserve bank may facilitate the control of the total money supply for a given currency that may comprise both physical banknotes and coins, as well as digital currency that is maintained digitally on the digital currency network. As part of this control, the reserve bank could facilitate conversion of physical banknotes to digital currency in a way that keeps the total supply of currency in circulation (across both physical and digital mediums) fixed. In particular, as more and more transactions are made using digital currency, conversion system 101 could be used to transform a greater percentage of existing physical currency into digital currency.

It may be appreciated that in some cases, especially during the transition process between an economy of primarily physical currency and an economy of primarily digital currency, a reserve bank could manage a hybrid currency system, where the physical currency and the digital currency are different currencies that are not in a one-to-one correspondence, but which are both backed by the reserve bank(s). That is, the exemplary process does not require that the digital currency and the physical currency are the same. As an example, the physical currency could comprise the US dollar, while the digital currency could comprise some other cryptocurrency such as Bitcoin. In such cases, creating new digital currency requires converting the denomination of the banknotes in US dollars into an appropriate amount of cryptocurrency having the same monetary value or purchasing power. In other cases, the digital currency may be identical in terms of value to the physical currency. For example, in the US, every physical dollar may equate to a "digital dollar" on the digital currency network.

Figure 2:
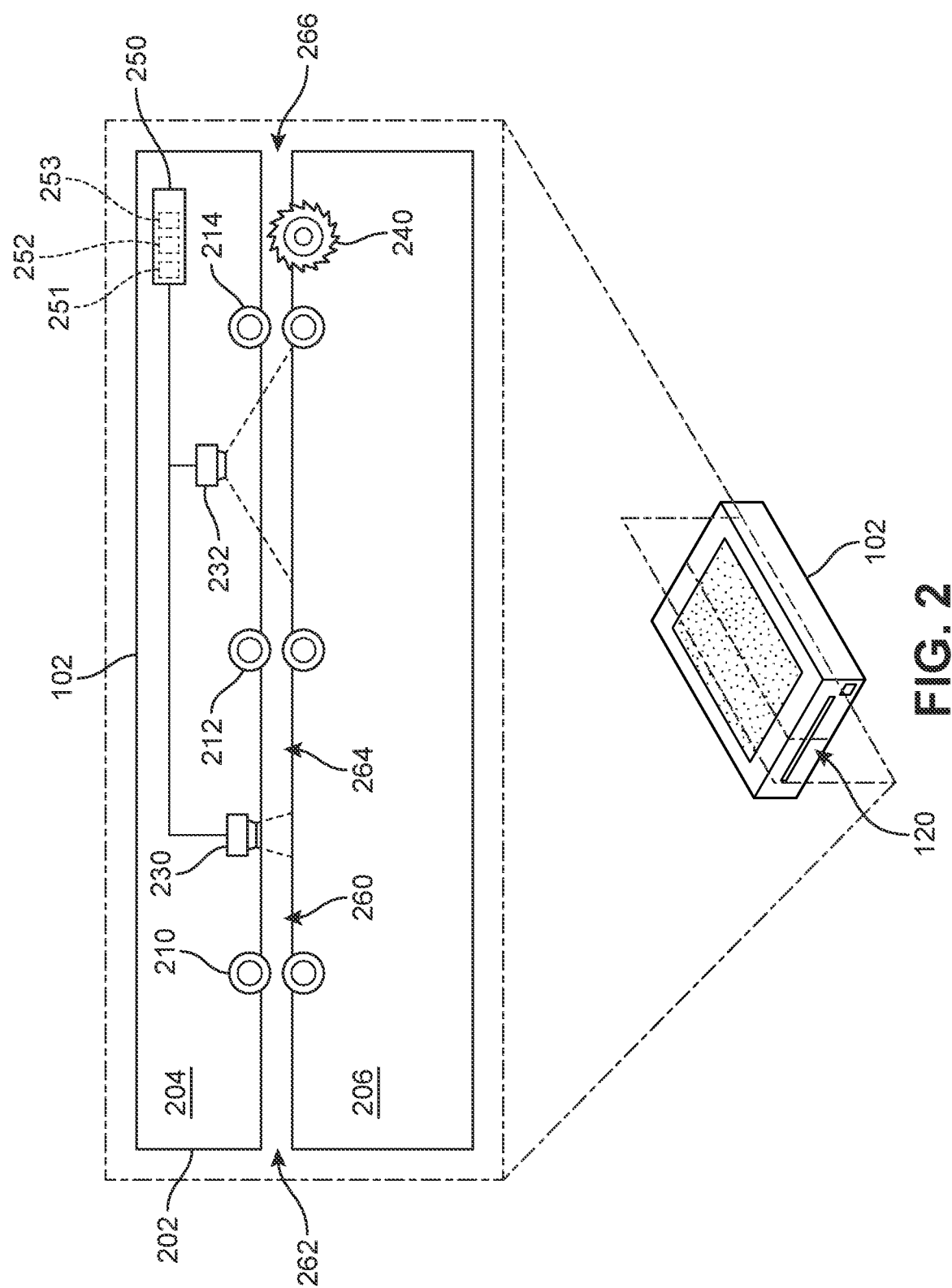
FIG. 2 is a schematic view of a device for scanning and shredding banknotes, according to an embodiment.

FIG. 2 is a schematic view of device 102, including a schematic cross-sectional view of various parts and components of device 102. Referring to FIG. 2, device 102 can comprise a device housing 202. Housing 202 may comprise any suitable form factor and may be made of any suitable materials (such as plastic and/or metal). In at least one embodiment, housing 202 has a generally rectangular, or box-like, form factor.

Device 102 also includes an upper housing portion 204 and a lower housing portion 206. A slot 260 extends through housing 202, and is open on opposing ends of housing 202. Specifically, slot 260 comprises a banknote receiving end 262 and a banknote exiting end 266, as well as an intermediate slot portion 264 disposed between banknote receiving end 262 and banknote exiting end 266. Processing of a banknote begins by feeding the banknote into the banknote receiving end 262.

Slot 260 may be sized and shaped to receive a banknote of a specific form factor. For example, in some embodiments, slot 260 is sized and shaped to receive U.S. dollar bills of various denominations. The size and shape of slot 260 may also be constrained by the presence of various additional components or mechanisms disposed within housing 202, some of which are described in detail below.

Device 102 can include conveying mechanisms that allow banknotes fed into banknote receiving end 262 to be conveyed through the entire length of slot 260 and then out of banknote exiting end 266. In the exemplary embodiment, device 102 includes first conveying mechanism 210, second conveying mechanism 212, and third conveying mechanism 214. Moreover, in this example, each conveying mechanism is comprised of a pair of opposing rollers that can be used to grip and pass banknotes through slot 260. Although the embodiments use three sets of rollers, other embodiments could include any suitable number and the sets of rollers can be suitably spaced to ensure banknotes are correctly received at one end of the slot, fed through the entire slot, shredded, and then completely expelled through the opposing end of the slot.

Device 102 can also include one or more optical devices for capturing images of all or portions of a banknote as it passes through slot 260. Specifically, device 102 may include a first optical device 230 and a second optical device 232. First optical device 230 may be positioned within device housing 202 so that it can scan a full image of a banknote as the banknote passes through device 102. Second optical device 232 may be positioned within device housing 202 so that it can capture snapshots of particular portions of a banknote. In some embodiments, second optical device 232 is positioned to capture snapshots of portions of a banknote that include the banknote's serial number. Moreover, as seen in FIG. 2, first optical device 230 is disposed closer to banknote receiving end 262 of slot 260, than it is to banknote exiting end 266, with respect to a lengthwise, or longitudinal, direction of slot 260. Likewise, second optical device 232 is disposed closer to banknote exiting end 266 of slot 260, than it is to banknote receiving end 262, with respect to the lengthwise or longitudinal direction of slot 260.

It may be appreciated that the vertical position of each optical device can be selected to achieve a desired imaging area. For example, first optical device 230 may be vertically lower (and closer to slot 260) as this optical device is configured to continuously scan a narrow strip of a banknote passing through device 102 so as to build up a complete image of the entire banknote.

By contrast, second optical device 232 is disposed vertically higher (and relatively further from slot 260 compared to second optical device 232) to provide a larger imaging area that is capable of capturing the entire serial number of a banknote all at once.

First optical device 230 and second optical device 232 can comprise any suitable optical devices, including any kinds of digital image sensors. Exemplary optical devices may include devices comprised of suitable image sensors such as charge coupled devices (CCDs) and active-pixel sensors.

Device 102 can include a shredding assembly 240 that may be used to shred banknotes as they exit slot 260 through banknote exiting end 266. Shredding assembly 240 may be comprised of any suitable components used in shredding paper, and especially in shredding banknotes. For purposes of illustration only a single rotary cutter is shown in the figures, but it may be appreciated that shredding assembly 240 can comprise any suitable components. These can include various rotary cutters and static cutters, along with actuating mechanisms for turning the rotary cutters.

As seen in FIG. 2, shredding assembly 240 may be disposed adjacent to banknote exiting end 266 of slot 260. With this configuration, second optical device 232 may be disposed between shredding assembly 240 and first optical device 230, with respect to a lengthwise direction of slot 260.

Device 102 can also include one or more control units. For purposes of illustration, a single control unit 250 is shown in FIG. 2. Control unit 250 may be further comprised of discrete components, or could comprise an integrated circuit. Control unit 250 may include processors 251, memory 252, and one or more networking components 253. Processors 251 could comprise any suitable processors for device 102. Memory 252 may be any suitable non-transitory medium that can store instructions that are executable by processors 251. In addition, networking components 253 can include suitable components for establishing wired or wireless connections with other systems, such as digital currency minting system 104. For example, networking components 253 could include radios and other circuits for enabling suitable local area networks or personal area networks.

Although not shown in the exemplary embodiment, the banknote destroying device could be configured with one or more sensors for detecting security features of a banknote, thereby ensuring that counterfeit banknotes are not converted to digital currency. Such features can include magnetic sensors that can detect the presence of magnetic ink used in many banknotes as a security feature. It may be appreciated that in some embodiments, other sorting systems can be used to scan banknotes for the purpose of detecting counterfeit banknotes, before passing the banknotes to a banknote destroying, such as device 102.

Figure 3A:
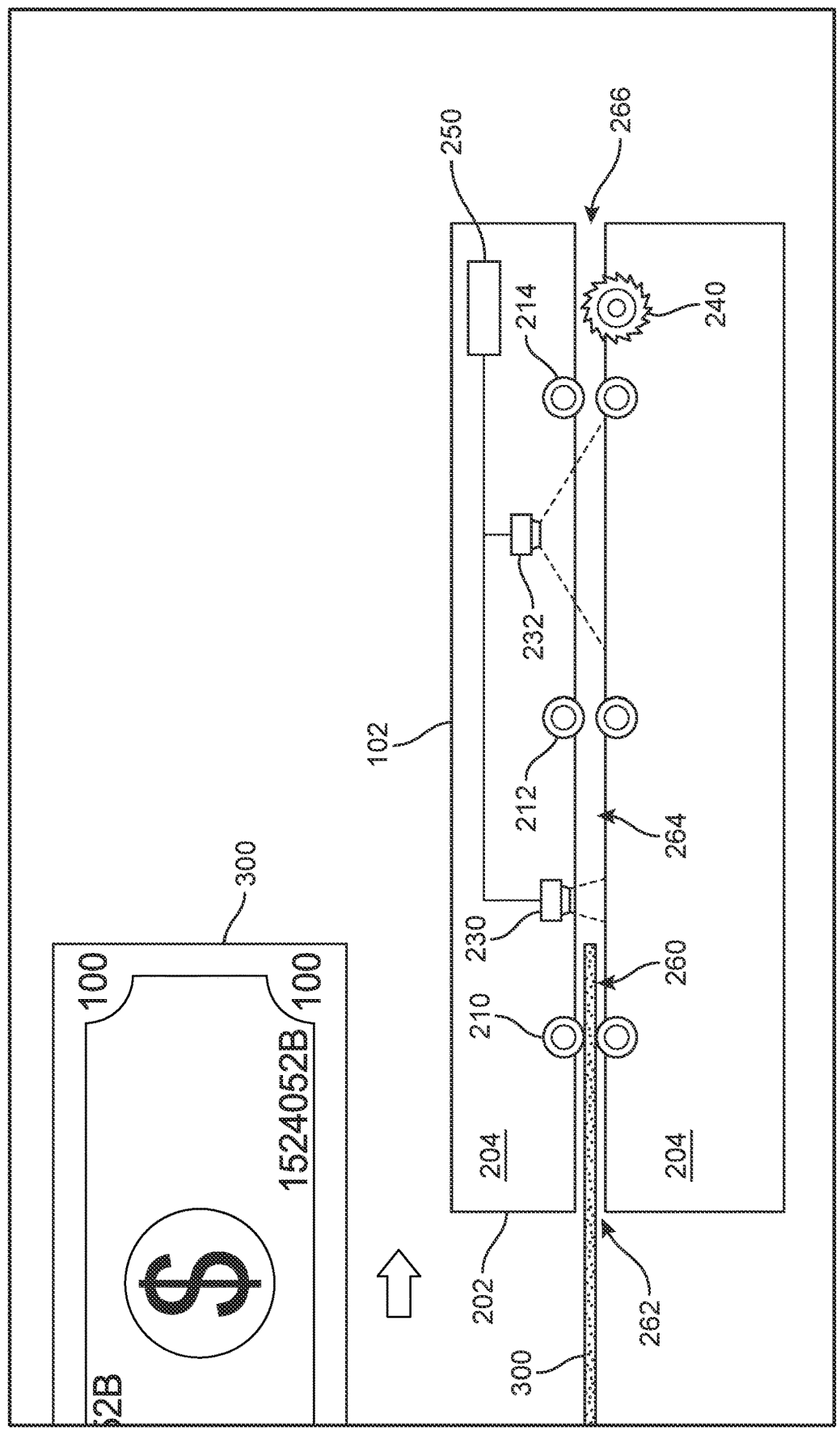
FIGS. 3A-3E are schematic views showing the operation of a device for scanning and shredding banknotes, according to an embodiment.
Figure 3B:
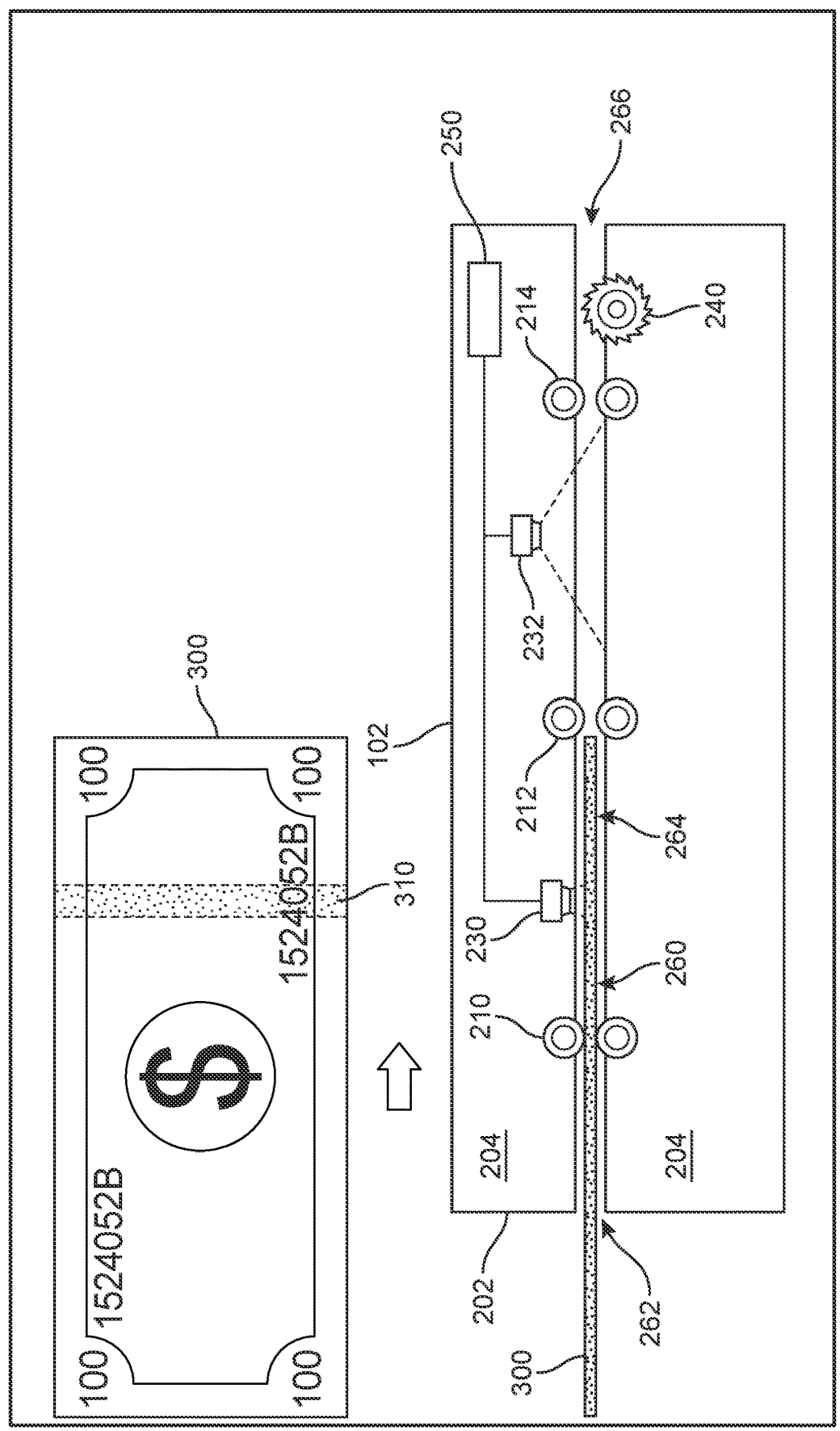
Figure 3C:
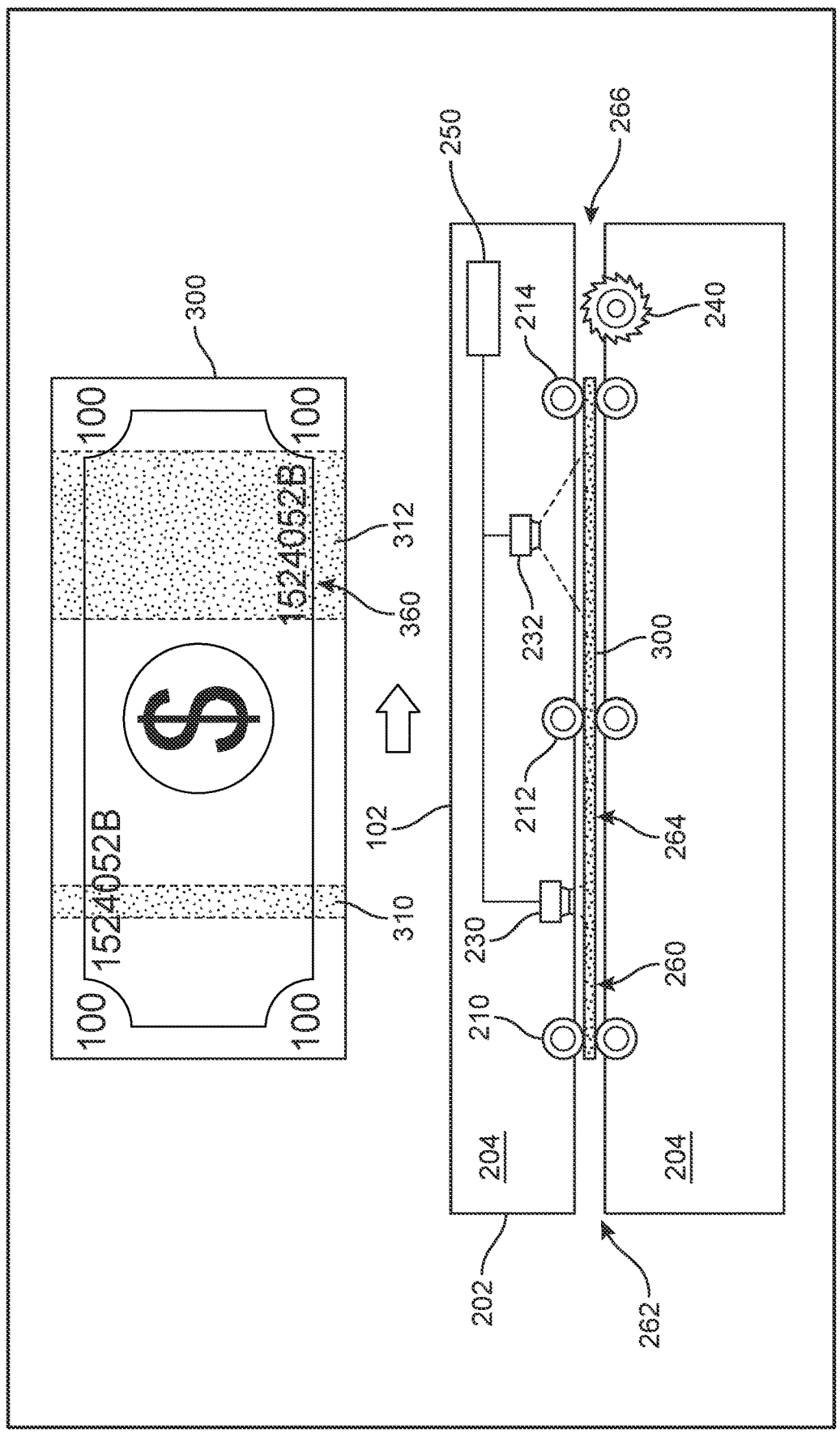
Figure 3D:
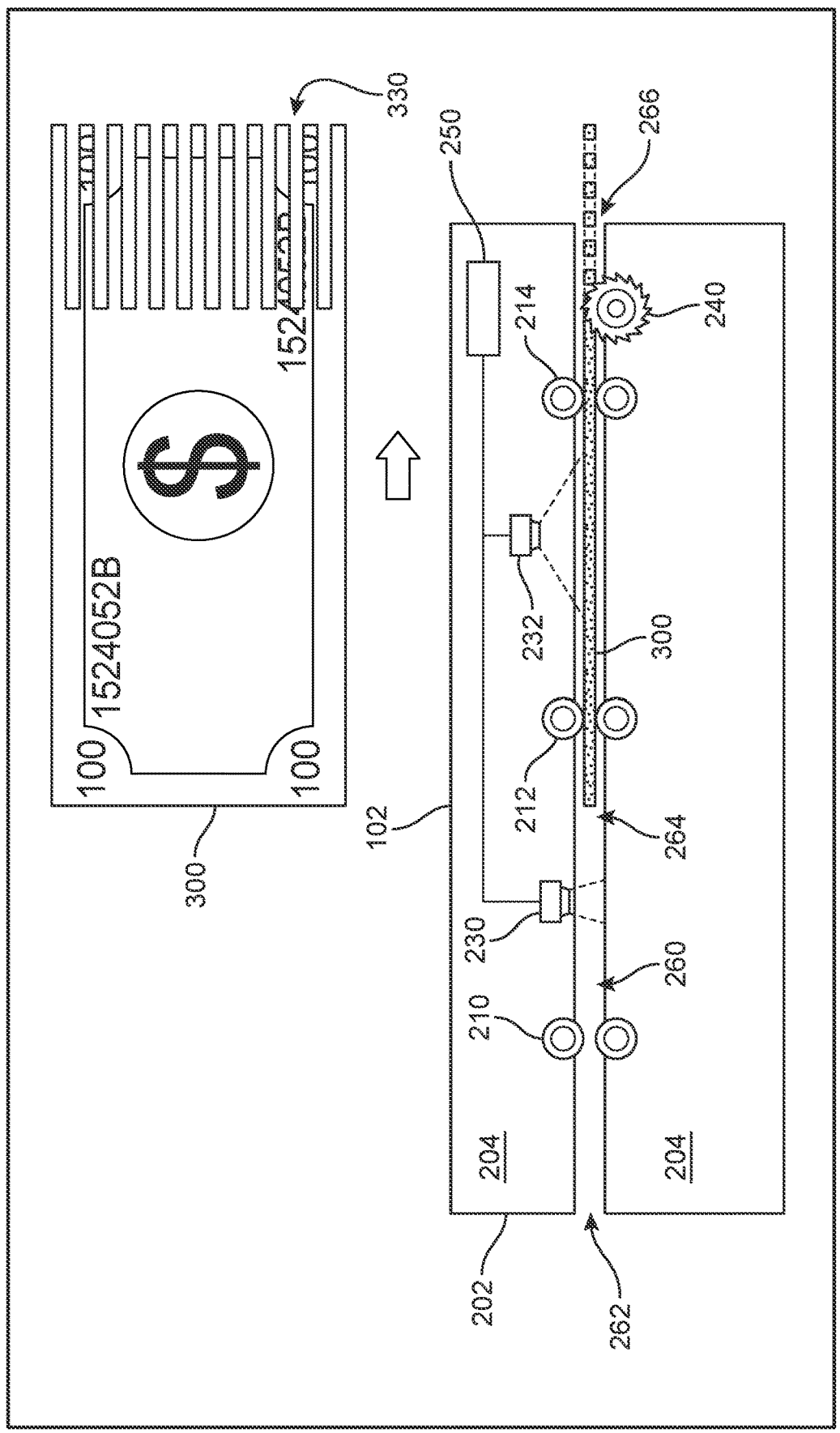
Figure 3E:
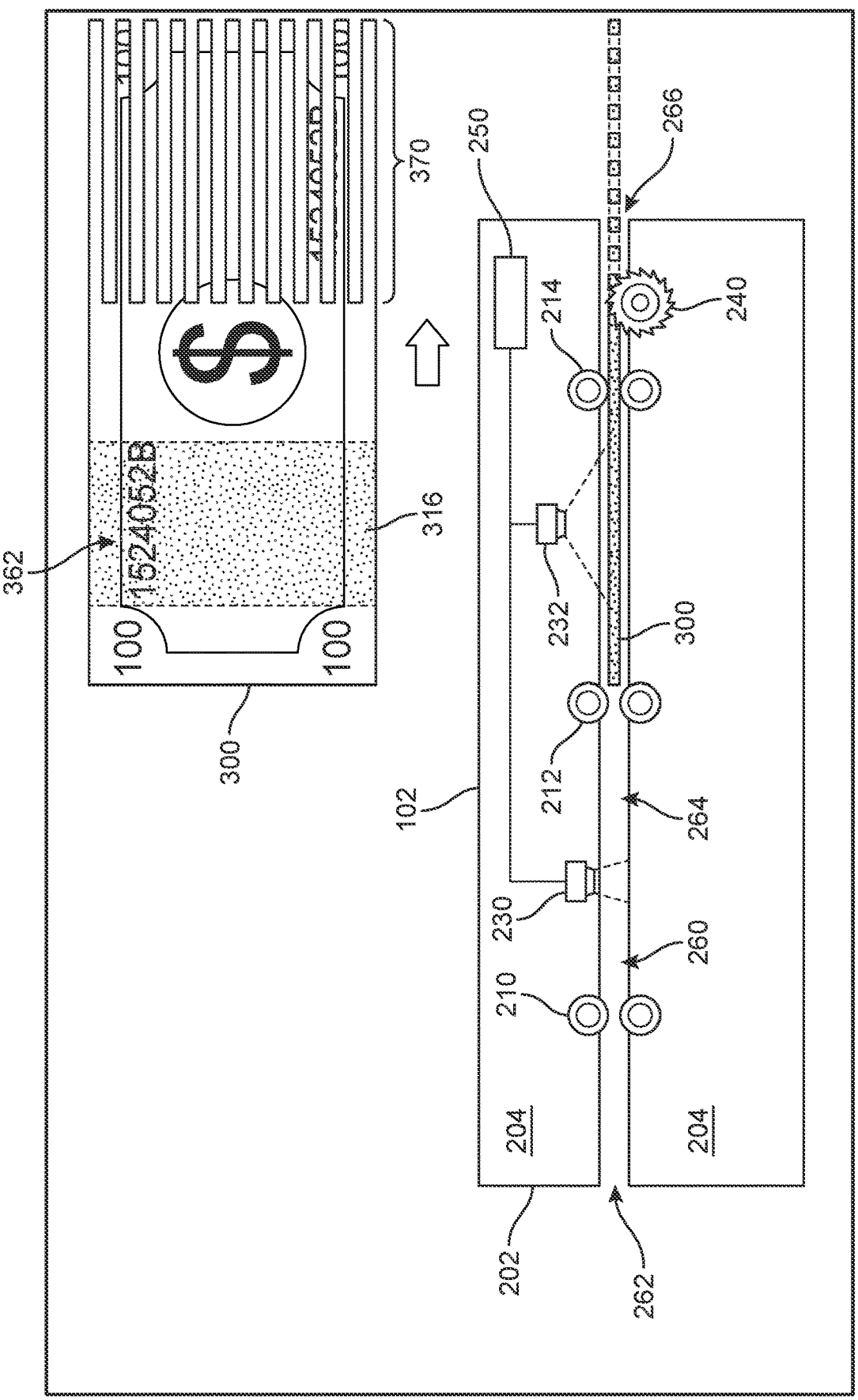
Figure 4:
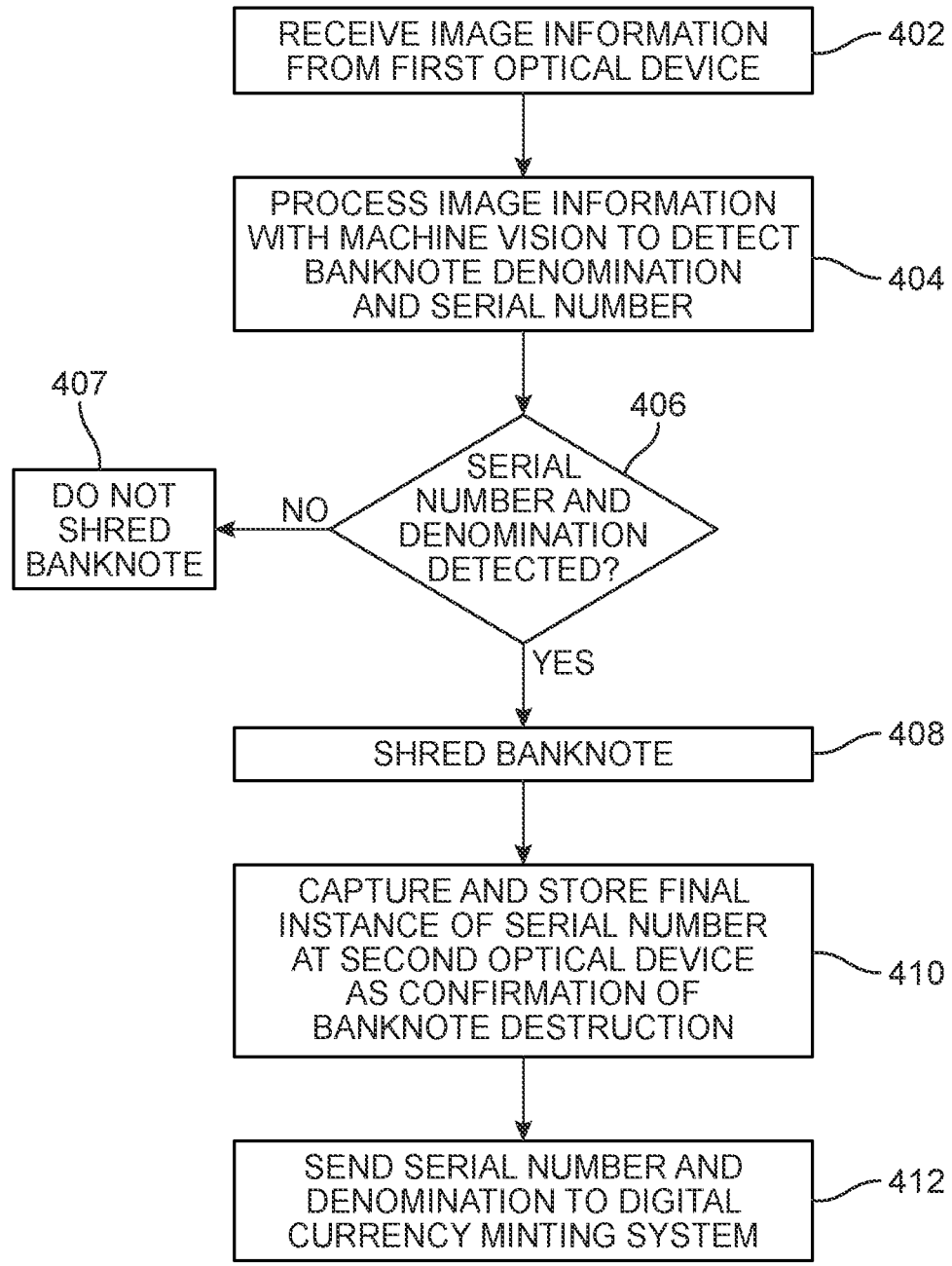
FIG. 4 is a schematic view of a process implemented by part of a system for transforming physical currency into digital currency, according to an embodiment.

The exemplary operation of device 102 is illustrated schematically in FIGS. 3A-3E, along with a method for the control unit shown in FIG. 4. For purposes of illustration FIGS. 3A-3E include both a side schematic view of a banknote moving through device 102, as well as a straight-on view of one face of the banknote as it moves through device 102.

Referring first to FIG. 3A, a banknote 300 (a one-hundred-dollar bill) is inserted into device 102 at banknote receiving end 262. In this case, a user may push banknote 300 into slot 260 until banknote 300 is engaged by first conveying mechanism 210, which may grasp and move banknote 300 through the first part of slot 260.

FIG. 3B shows how a portion of banknote 300 is captured (scanned) by first optical device 230. Specifically, the portion of banknote 300 within the scanning area 310 is captured and stored in memory (for example, memory 252). As banknote 300 passes through slot 260, the entirety of banknote 300 may pass through scanning area 310, and be continuously scanned by first optical device 230 until a complete image is captured. The partial, or complete, image information can be stored in memory (for example, memory 252) and/or processed by control unit 250.

FIG. 3C shows how second optical device 232 can capture a full image 312 of a first serial number 360 that is disposed at one end of banknote 300. In particular, the full serial number may be captured in a single image, rather than being captured via continuous scanning through a smaller scanning area.

Soon after first serial number 360 is captured by second optical device 232, one end of banknote 300 may pass through shredding assembly 240, such that an end portion 330 of banknote 300 is shredded, as shown in FIG. 3D.

Referring now to FIG. 3E, second optical device 232 is configured to capture an image 314 of banknote 300 that includes second serial number 362. It may be appreciated that first serial number 360 and second serial number 362 are identical serial numbers printed onto two different locations of banknote 300. Here, image 314 including second serial number 362 provides a "confirmation of destruction" (or "proof of destruction") that subsequently can be checked by the digital currency minting system (or other auditing system) to ensure that digital currency is only created for destroyed banknotes.

At one or more stages of the exemplary process, machine vision algorithms, or other suitable optical character recognition algorithms, may be applied to any captured image information to extract both a denomination and a serial number for banknote 300. This information can then be passed to a digital currency minting system, as discussed in further detail below.

An important problem in transforming physical currency to digital currency is making sure that a physical banknote has in fact been destroyed. Otherwise, it may be possible to fraudulently mint digital currency by removing a banknote from the banknote destroying device before a sufficient amount of the banknote has been shredded to invalidate spending the physical banknote. A banknote may be considered destroyed, or invalid, when the percentage of the banknote that is damaged exceeds the banknote damage threshold for that banknote (as determined by a corresponding reserve bank or related entity).

The embodiments achieve a solution to this problem by positioning second optical device 232 at a location where an image of the last instance of the serial number on the banknote cannot be captured before a sufficient amount of the banknote has been shredded (in other words, as soon as the percentage of the banknote that has been shredded exceeds the banknote damage threshold). The captured image of the serial number then acts as confirmation that the banknote has been destroyed. By contrast, any images captured by first optical device 230, because of the greater separation of first optical device 230 and shredding assembly 240, may conceivably be captured before a sufficient portion of the banknote has been destroyed.

Because some banknotes include multiple instances of the same serial number (that is, the same serial number is printed in different locations on the same banknote), second optical device 232 may be specifically positioned to ensure that the second instance (or final instance) of the serial number is only captured once a sufficient amount of the banknote has been shredded. To determine the final instance of a serial number, a system may be programmed to know the total number of serial numbers printed on a given kind of banknote. The system may then count the number of distinct serial numbers captured by second optical device 232, and only use the image having the final (in this case, second) instance of the serial number as confirmation of destruction. Alternatively, the system could save images for each instance of the serial number and submit an image for each different instance as confirmation of destruction.

The precise (maximum) distance between second optical device 232 and shredding assembly 240 may be determined according to the specific banknote damage threshold for a given currency. For example, if the banknote damage threshold is fifty percent, then the distance between second optical device 232 and shredding assembly 240 may be selected so that the second (or final) instance of the serial number is not positioned below second optical device 232 until at least fifty percent of the banknote has been shredded. This ensures that once a second image of the banknote's serial number has been captured by second optical device 232, the system can be assured that the physical banknote is no longer valid.

FIG. 4 is a schematic view of a process that may be performed by a controlling system as part of the process of transforming physical currency into digital currency. In some cases, one or more of the following steps could be performed by a control unit of a banknote destroying device (such as control unit 250 of device 102).

Starting in step 402, control unit 250 may receive image information from a first optical device. In some cases, this first optical device can be a camera for scanning banknotes as they are inserted into a slot of a device, such as first camera 230 of FIG. 2. The image information may comprise, in some cases, an image of a narrow portion of a banknote. In some cases, a full image of the banknote can be formed by continuously capturing partial images of, or scanning, the banknote as it moves beneath the first optical device.

Next, in step 404, control unit 250 can process image information using one or more machine vision algorithms to detect the banknote's denomination as well as the banknote's serial number. Control unit 250 may wait until a sufficient portion (for example, 30-50 percent) of the banknote has been scanned, before attempting to detect these numbers from the partially scanned image of the banknote.

In step 406, control unit 250 can determine if both the serial number and denomination have been detected. If either value has not been detected after a sufficient percentage of the banknote has been scanned, control unit 250 may continue to step 407. Without a denomination, the system cannot properly convert the physical banknote into a corresponding value of digital currency. Likewise, without a serial number, the system cannot easily track the banknote and confirm the destruction of the banknote following the conversion process. Therefore, whenever either the denomination or serial number cannot be determined, the control unit 250 may prevent the banknote from being shredded. This could occur in one or more ways. In some embodiments, the conveying mechanism used to convey the banknote through the slot can reverse direction so that the banknote exits (that is, the bill is "spit out") from the banknote receiving end before any portion of the banknote reaches the shredding assembly. Alternatively, in another embodiment, control unit 250 may be configured to send control signals to a shredding assembly to stop the assembly so that the banknote can pass through the banknote exiting end without being shredded/destroyed. In some cases, banknotes that have been rejected in this way can be further processed by other machines and/or human operators who can further analyze the banknotes.

These steps of checking that the serial number and denomination have been detected may help prevent banknotes from being shredded when they are inserted with the wrong side facing the camera, so that serial numbers cannot be extracted. This may also prevent shredding banknotes where the serial number and/or denomination are illegible because of wear to the banknote.

If the serial number and denomination of a banknote have been extracted from a partial image of the banknote, control unit 250 can proceed to step 408. In step 408, the banknote may be shredded. This can be achieved by continuing to convey the banknote towards the shredding assembly adjacent the banknote exiting end of the device.

In step 410, control unit 250 may capture a partial image of the banknote including the serial number using a second optical device and store this partial image in memory. As already discussed, the second optical device may be positioned so that the last (final) instance of the serial number passes under second optical device just as a sufficient amount of the banknote has been shredded to ensure the banknote is destroyed and no longer redeemable. Thus, capturing an image with the final instance of the serial number using the second optical device functions as confirmation of destruction of the banknote.

In step 412, control system 250 may send the confirmation of destruction image as well as the stored serial number and/or denomination information (or currency value information) to a digital currency minting system. The system can use this information to generate and/or distribute digital currency in an amount associated with the banknote denomination. In particular, the digital currency minting system may only generate new currency if the confirmation of destruction image is provided, along with the denomination and/or serial number. This helps ensure new currency is not generated before a banknote has physically been destroyed, thereby preventing double spending of that money. It may also be appreciated that in some cases, before generating new digital currency, a banknote minting system could look up the serial number for the banknote in a registry to check that the banknote is valid. Here, validity may mean that 1) a banknote with the same serial number has not previously been converted into digital currency and 2) the serial number is a valid serial number (as opposed to an invalid serial number suggesting the banknote may be counterfeit).

Once a digital minting system has generated new digital currency using this process, the new digital currency can be "spent" by sending the digital currency to an existing address on the digital currency network. This acts to put the new digital currency into circulation on the network.

Banknotes can come in different form factors (including length and width) and can also have serial numbers and denomination information positioned at different locations along a banknote. To ensure that the desired distance between a shredding assembly and an optical device can be achieved for different banknote form factors and designs, some embodiments can include an optical device with an adjustable position.

Figure 5:
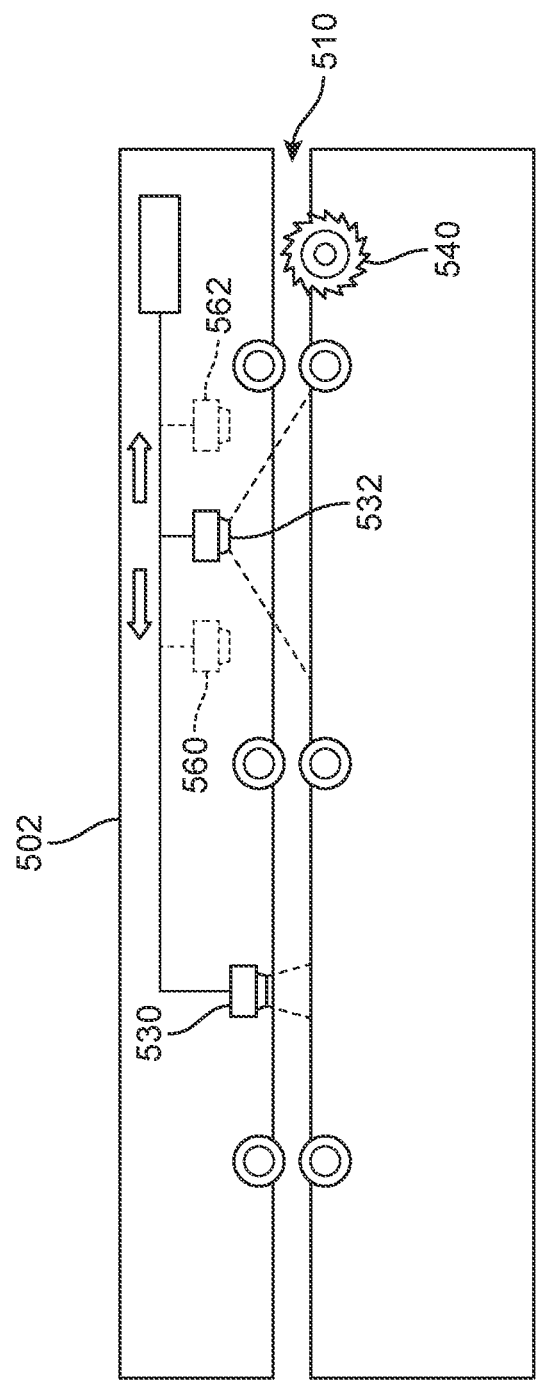
FIG. 5 is a schematic view of a device for scanning and shredding banknotes, according to another embodiment.

Referring to FIG. 5, device 502 includes similar components to device 102 of FIG. 2. These include, for example, first optical device 530 and second optical device 532. By contrast with earlier embodiments, the position of second optical device 532 is adjustable in the present embodiment. Specifically, a longitudinal position of second optical device 532 can be adjusted between a first longitudinal position 560 and a second longitudinal position 562. In this way, second optical device 532 can be moved closer to, or further away from, shredding assembly 540 (as well as a banknote exiting end of slot 510).

In addition to providing flexibility for different banknote designs and form factors, the exemplary embodiments allows the distance between second optical device 532 and shredding assembly 540 to be adjusted to accommodate different banknote damage thresholds.

Figure 6:
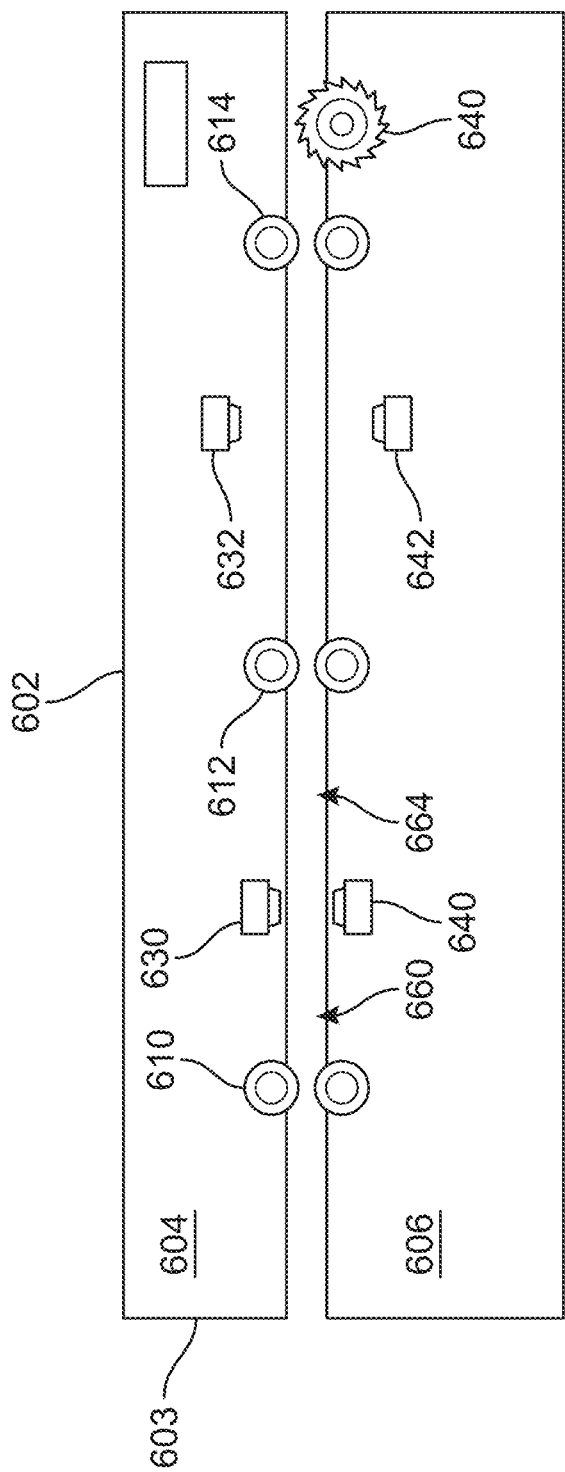
FIG. 6 is a schematic view of a device for scanning and shredding banknotes, according to still another embodiment.

To accommodate the possibility that a banknote could be inserted face up or face down, a system could include corresponding pairs of optical devices on both a top and bottom side of the device. In another embodiment, considered in FIG. 6, a device 602 is configured with many similar features to device 102 shown in FIG. 2. These include a housing portion 603 with a slot 660, comprised of an upper housing portion 604 and a lower housing portion 606 and conveying mechanisms (mechanism 610, mechanism 612, and mechanism 614). Within upper housing portion 604, device 602 includes a first optical device 630 and a second optical device 632. Additionally, lower housing portion 606 includes a third optical device 640 and a fourth optical device 642. Using a pair of optical sensors within both the upper housing portion 604 and the lower housing portion 606 allows device 602 to capture images of both sides of a banknote, ensuring that images of the serial number and denomination can be retrieved regardless of how the banknote is inserted into device 602.

Figure 7:
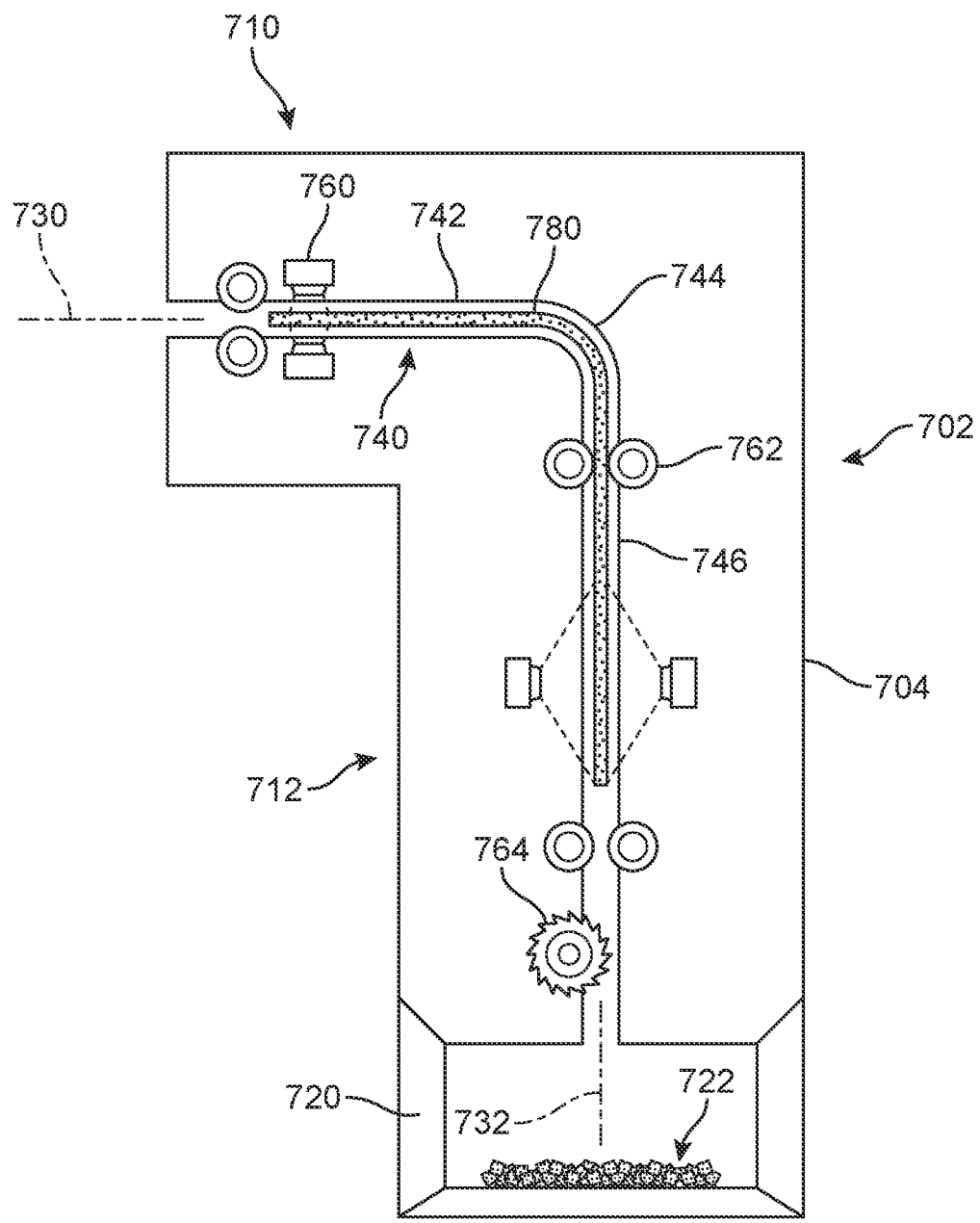
FIG. 7 is a schematic view of a device for scanning and shredding banknotes, according to still another embodiment.

FIG. 7 is an exemplary view of yet another embodiment of a banknote destroying device. Referring to FIG. 7, device 702 is configured so that banknotes can be inserted horizontally, scanned, shredded, and then deposited vertically beneath the device. In this example, device 702 comprises a device housing 704. Housing 704 further comprises a first housing portion 710 and a second housing portion 712. Here, second housing portion 712 is configured in a vertical position, while first housing portion 710 extends horizontally away from second housing portion 712.

Device 702 includes a slot 740, which is itself comprised of a first slot portion 742 and a second slot portion 746, which are oriented in the horizontal and vertical directions, respectively. Moreover, these portions are connected by a curved intermediate slot portion 744. Device 702 further includes similar components to earlier embodiments, such as optical devices 760, conveying mechanisms 762, and a shredding assembly 764. Moreover, to catch shredded material, device 702 includes a capturing portion 720 that comprises part of the device's base.

In operation, a banknote 780 may be fed into slot 740 in a first direction 730, which is a horizontal direction in this exemplary embodiment. Banknote 780 is processed as in earlier embodiments, being conveyed through the slot as images of the banknote are captured. Banknote 780 exits slot 740, after passing through shredding assembly 764, in a second direction 732. Here, second direction 732 may be seen to be approximately perpendicular to first direction 730. Moreover, in this exemplary embodiment, second direction 732 is a vertical direction.

For simplicity, a device configured to manage one bill at a time is shown. In some embodiments, a device could be configured for higher thruput.

In some cases, a banknote destroying device could be used in combination with a banknote processing system that scans for defective or counterfeit dollars. In some cases, banknotes could first be processed by such a banknote processing system, allowing counterfeit banknotes to be removed. Remaining banknotes could then be passed through a scanning and shredding device of the embodiments. This allows for capturing serial numbers, denominations, and capturing images of a banknote's serial number at the time it is destroyed beyond the banknote damage threshold, thereby providing confirmation of a valid physical to digital conversion.

By using at least two optical devices, the embodiments provide a system that can readily provide confirmation of destruction of a banknote while preventing banknotes whose denominations and/or serial numbers cannot be read from being destroyed. This is accomplished by using a first camera closer to the banknote receiving end of the slot to scan image information before the banknote is close to the shredding apparatus. This provides sufficient time to determine if the necessary information has been captured before a substantial portion of the banknote has been shredded. Then, by using a second camera downstream of the first camera, and spaced at pre-determined distance from the shredding assembly, the device can capture confirmation of destruction only after a sufficient portion of the banknote has been shredded.

The embodiments could utilize different methods and systems for creating new currency with a digital currency minting system. In one embodiment, for example, a reserve bank may operate with sufficient resources to mine new digital currency according to the mining requirements of that digital currency. In still other embodiments, a reserve bank could utilize a special kind of digital currency network in which some parties (in this case, reserve banks) are uniquely able to create new digital currency.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A device, comprising:
   a device housing;
   a slot disposed in the device housing for receiving a banknote, wherein the slot includes a banknote receiving end and a banknote exiting end;
   one or more conveying mechanisms to move the banknote from the banknote receiving end to the banknote exiting end of the slot;
   a first optical device for scanning images of the banknote passed through the slot;
   a shredding assembly for shredding the banknote passed through the slot; and
   a second optical device for capturing a confirmation of destruction image of the banknote, the confirmation of destruction image including a serial number of the banknote, and the confirmation of destruction image being captured after a sufficient portion of the banknote has been destroyed by the shredding assembly so as to render the banknote invalid as currency.

2. The device according to claim 1, wherein:
   the first optical device is disposed closer to the banknote receiving end of the slot than to the banknote exiting end of the slot;
   the shredding assembly is disposed closer to the banknote exiting end of the slot than to the banknote receiving end of the slot; and
   the second optical device is disposed between the first optical device and the shredding assembly with respect to a lengthwise direction of the slot.

3. The device according to claim 1, wherein a longitudinal distance between the second optical device and the shredding assembly is configured so that at least half of the banknote is destroyed when the confirmation of destruction image is captured.

4. The device according to claim 1, wherein the one or more conveying mechanisms includes rollers.

5. The device according to claim 1, wherein:
   the housing comprises an upper housing portion and a lower housing portion;

wherein the first optical device and the second optical device are disposed in the upper housing portion;

wherein the device further includes a third optical device and a fourth optical device, and wherein the third optical device and the fourth optical device are disposed in the lower housing portion; and wherein the first optical device and the second optical device are configured to capture images of a first side of a banknote and wherein the third optical device and the fourth optical device are configured to capture a second side of the banknote.

6. The device according to claim 1, wherein the slot includes a first slot portion and a second slot portion, and wherein the first slot portion is oriented in a substantially different direction from the second slot portion.

7. The device according to claim 6, wherein banknotes can be inserted into the device in a horizontal direction and wherein banknotes can exit the device in a vertical direction.

8. A device, comprising:
a device housing;
a slot disposed in the device housing for receiving banknotes, wherein the slot includes a banknote receiving end and a banknote exiting end;
one or more conveying mechanisms to move banknotes from the banknote receiving end to the banknote exiting end of the slot;
a first optical device for scanning images of banknotes passed through the slot;
a second optical device for capturing images of serial numbers on banknotes passed through the slot;
a shredding assembly for shredding banknotes passed through the slot; and
the device being further configured to:
receive a banknote at the banknote receiving end;
convey the banknote through the slot towards the banknote exiting end using the one or more conveying mechanisms;
scan a full image of the banknote using the first optical device;
capture an image of a serial number on the banknote using the second optical device to provide confirmation of destruction of the banknote; and
shred the banknote before the banknote exits the slot.

9. The device according to claim 8, wherein the first optical device is disposed closer to the banknote receiving end of the slot than to the banknote exiting end of the slot;
the shredding assembly is disposed closer to the banknote exiting end of the slot than to the banknote receiving end of the slot; and
the second optical device is disposed between the first optical device and the shredding assembly with respect to a longitudinal direction of the slot.

10. The device according to claim 8, wherein a longitudinal distance between the second optical device and the shredding assembly is configured so that at least half of the banknote is destroyed when the confirmation of destruction image is captured.

11. The device according to claim 9, wherein the one or more conveying mechanisms includes rollers.

12. The device according to claim 8, wherein the device further includes a programmable control unit, and wherein the programmable control unit is further configured to:
determine if the image of a serial number has been captured by the second optical device; and
prevent the shredding assembly from shredding the banknote when the image of a serial number has not been captured.

13. The device according to claim 8, wherein the programmable control unit is further configured to retrieve a serial number for storage in memory of the image of a serial number captured by the second optical device.

14. A system for converting physical currency to digital currency, comprising:
a device, the device comprising:
a device housing;
a slot disposed in the device housing for receiving a banknote, wherein the slot includes a banknote receiving end and a banknote exiting end;
one or more conveying mechanisms to move the banknote from the banknote receiving end to the banknote exiting end of the slot;
a first optical device for scanning images of the banknote passed through the slot;
a shredding assembly for shredding the banknote passed through the slot; and
a second optical device for capturing a confirmation of destruction image of the banknote, the confirmation of destruction image including a serial number of the banknote, and the confirmation of destruction image being captured after a sufficient portion of the banknote has been destroyed by the shredding assembly so as to render the banknote invalid as currency;
a digital currency minting system in communication with the device and in communication with a digital currency network;
wherein the device is further configured to:
receive a banknote at the banknote receiving end of the device;
convey the banknote through the slot towards the banknote exiting end using the one or more conveying mechanisms;
scan a full image of the banknote using the first optical device and extract currency value information from the full image of the banknote;
capture a confirmation of destruction image including a serial number on the banknote using the second optical device;
shred the banknote before the banknote exits the slot; and
send the currency value information and the confirmation of destruction to the digital currency minting system; and
wherein the digital currency minting system is further configured to create new digital currency with a value according to the currency value information, the new digital currency being useable on the digital currency network.

15. The system according to claim 14, wherein the digital currency minting system is further configured to check the serial number against a registry to confirm that the banknote is valid.

16. The system according to claim 14, wherein the digital currency minting system is further configured to convert, prior to creating the new digital currency, a currency value corresponding to the denomination into an equivalent currency value for the new digital currency.

17. The system according to claim 14, wherein the digital currency minting system is further configured to send the new digital currency to an account registered with the digital currency network.

18. The system according to claim 14, wherein the first optical device is disposed closer to the banknote receiving end of the slot than to the banknote exiting end of the slot;

the shredding assembly is disposed closer to the banknote exiting end of the slot than to the banknote receiving end of the slot; and the second optical device is disposed between the first optical device and the shredding assembly with respect to a lengthwise direction of the slot.

19. The system according to claim 14, wherein a longitudinal distance between the second optical device and the shredding assembly is configured so that at least half of the banknote is destroyed when the confirmation of destruction image is captured.

20. The system according to claim 14, wherein the system is configured to be operated by a member of a reserve bank having control over one or more currencies.

* * * * *